United States Patent Office 3,365,592
Patented Jan. 23, 1968

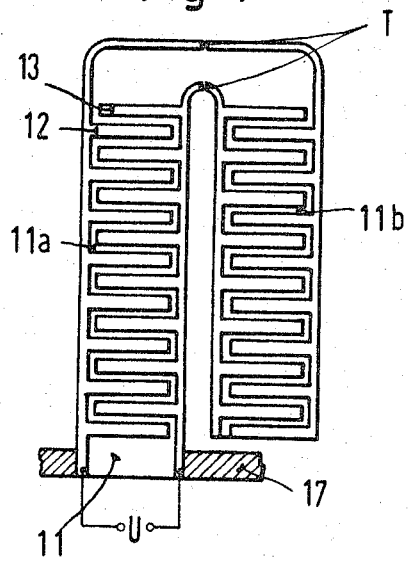
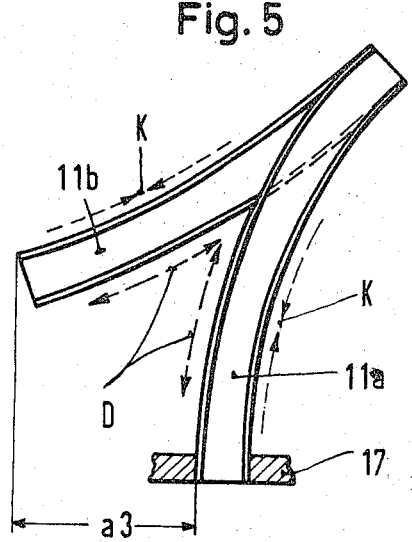
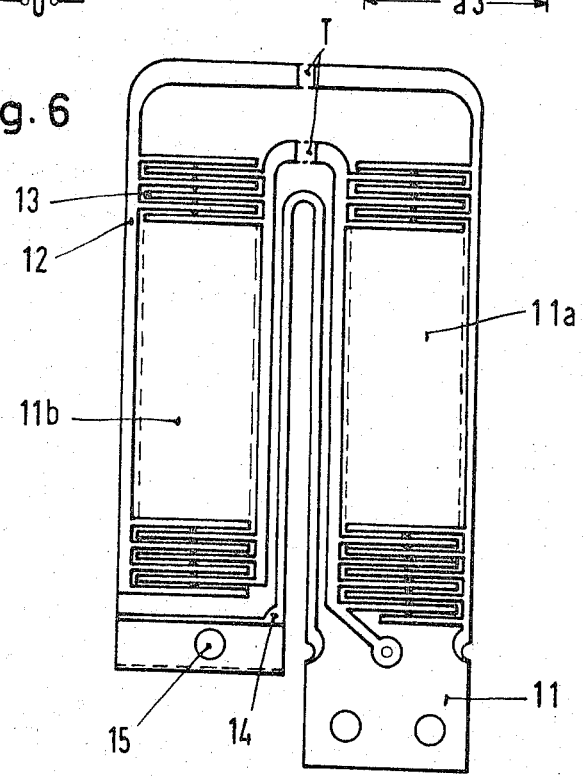

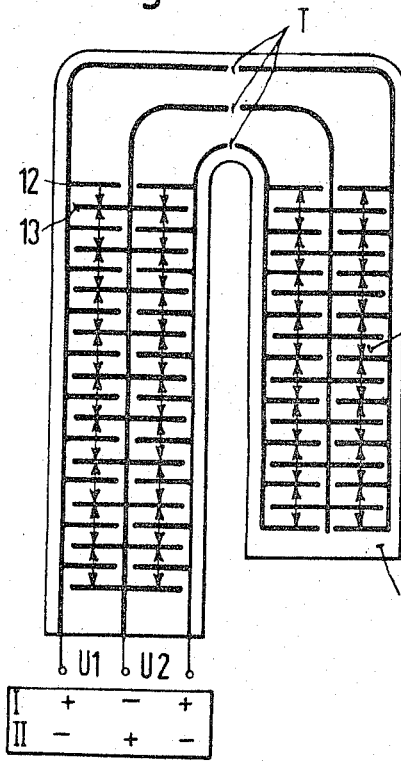
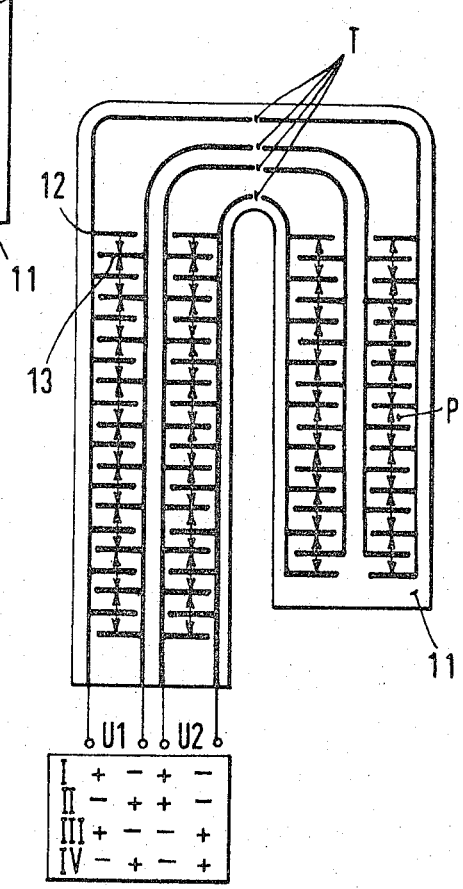

3,365,592
PIEZOELECTRIC RELAY
Herbert Krautwald and Helmut Schedele, Munich, Germany, assignors to Siemens Aktiengesellschaft, Munich, Germany, a corporation of Germany
Filed Oct. 22, 1965, Ser. No. 501,532
8 Claims. (Cl. 310—8.5)

This invention relates to a piezoelectric relay, and more particularly to a piezoelectric relay having a polarized bar composed of an electrostrictive material having on its surface at least two electrically conductive coatings which are operatively connected to the terminals of a source of control voltage.

In the past, arrangements were constructed by reversing the piezoelectric effect which can be used for the construction of relays. The only excitation in such a relay is the static influencing of an electrostrictive body via electrically conductive coatings applied to it, no exciter coil is required in such relays. Consequently, the iron and copper requirements always required in electromagnetic relays may be dispensed with.

When a control voltage is connected to the coatings of an electrostrictive body, a conversion of the electrical energy into mechanical energy takes place, as is known, whereby the elastic deformation of the electrostrictive body, operative as a dielectric, is produced. Generally this deformation is called electrostriction. As a result of this elastic deformation of an electrostrictive body, a contact arrangement connected thereto can be operated similar to the manner of operation of a relay.

The advantage of such arrangements, generally designated as static or piezoelectric arrangements, resides not only in the extremely low electrical power requirement and the elimination of an exciter coil, which also prevents the occurrence of magnetic leakage fields, but also in the considerably smaller overall dimensions resulting therefrom. However, it is difficult to obtain a deflection sufficient for an efficient contact operation of the electrostrictive body. That is why the devices thus far disclosed by prior art for the construction of piezoelectric relays did not lead to any usable embodiments for practical operation.

In order to achieve the polarization of the electrostrictive body necessary for a piezoelectric relay of this kind, said body, as is known, is generally heated beyond the Curie temperature and connected to a sufficiently high voltage at its applied coatings. For barium-titanate, for example, the Curie temperature is about 120° C. If the electrostrictive body then is allowed to cool under the influence of the voltage tension, it becomes polarized.

If a corresponding control voltage is then applied to the coatings of the electrostrictive body, a deformation occurs. This means that, depending on the direction of polarization, the external layers are expanded on one side of the electrostrictive body, while a compression takes place on the other side. When reversing the polarity of the control voltage, an opposite deflection takes place. The polarized electrostrictive body thus shows the behavior of a polar relay insofar as the contact operation is concerned.

An object of the present invention is to provide a piezoelectric relay producing a sufficiently large deflection to provide a contact stroke or contact force adequate for practical operations. In this connection, the contact arrangement is constructed, by means of a corresponding change in the polarity of the control voltage, to provide a deflection from a central resting position to two opposite directions.

According to the invention, this is accomplished by providing a piezoelectric relay having electrically conductive coatings applied on each side of a one-piece bar, preferably polarized layers strip-like in the longitudinal direction being constructed of comb-like members engaging each other, while maintaining a distance apart from each other.

A relatively large deflection, sufficiently great for the operation contact on a relay, is produced when the control voltage is applied due to the polarization which affects both sides of the bar and the correspondingly applied coatings. A further increase of the deflection can be accomplished by providing a U-shaped bar carrying the coatings in the plane of its maximum surface expansion, and the two shanks resulting therefrom are of opposite polarization. In this regard it is expedient to extend one shank of the U-shaped bar and cause it to become stationary, while the free shank carries the switching contact.

As mentioned above, in order to achieve the necessary polarization of the electrostrictive body, the coatings applied thereto must first be connected to a voltage source, in order to bring about a deformation of the bar in the direction of polarization. In order to accomplish the necessary opposite polarization of both bar shanks, it is necessary thereby to separate the electric coatings assigned to the shanks of the bar for the duration of the polarization process and to bridge the cut-off parts of the conductive coatings thereafter.

In order to achieve a still greater deflection, is is possible to provide the bar with a plurality of continuous U-shaped strips. Moreover, for special wiring purposes, it is possible to utilize correspondingly separate control voltage circuits by separating the coatings. Thus, in the case of the presence of identical voltages in opposite direction, no deflection of the bar takes place. This behavior is comparable to a polarized relay of the conventional design, having two windings of opposite effect. Here again the armature is not deflected from its resting position, if the applied control voltages are equal but opposite with all other dimensions being equal.

Additional details of the invention are shown in the following description of some embodiments.

FIGS. 4 and 5 likewise show an arrangement diagrammatically with a bar according to the invention designed U-shaped in the plane of its largest surface extension;

FIG. 6 shows the constructive embodiment of a U-shaped bar with switching contacts appropriate for a piezoelectric relay; and FIGS. 7 and 8 show comparable arrangements according to FIGS. 2 to 6 but with electrically separate coatings for the connection of different control voltage circuits.

Figure 1:
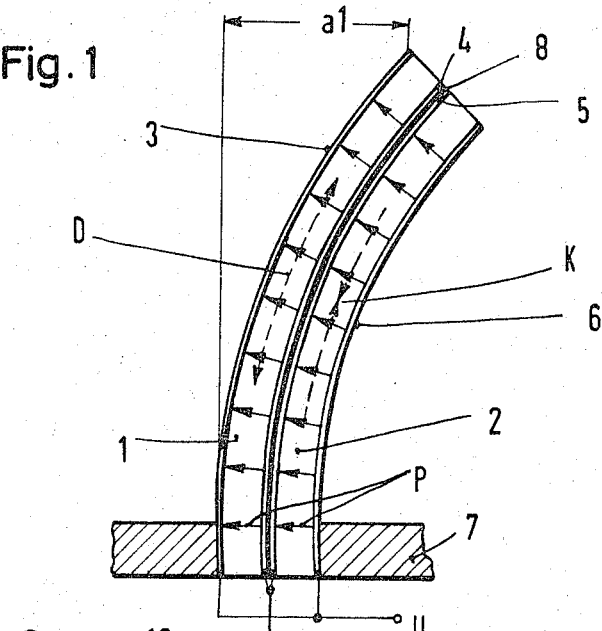
FIG. 1 shows prior art arrangement which is appropriate for electrostrictive contact operation.

FIG. 1 shows an arrangement for the electrostrictive contact operation, as used for example in piezoelectric relays as known in the prior art. In this case two polarized electrostrictive bars. Electrically conductive coatings 3, 4, 5 and 6 are placed on these bars, said coatings being mechanically interconnected in the form of vaporized-on electrodes, constructed similarly to a bi-metallic strip, by means of a binder 8. They are electrically connected in pairs in parallel, whereby the outer coats 3 and 6 or the lower inner coats 4 and 5 are conductively connected and can be connected to an operating voltage U. If the DC voltage U is effective at coatings 3 to 6, the voltage in the one bar is opposite to the direction of polarization, while in the other bar it aids the direction of polarization.

In the arrangement shown, which is known in the prior art, an expansion is thereby created in bar 1, which is identified by the reference character D, and whose direction of operation is shown by a double arrow in broken lines. On the other hand a compression K is produced in bar 2, whose direction of operation is shown by a double arrow in broken lines. This elastic deformation of bars 1 and 2, which occurs as a voltage is applied to the lamellas 1 and 2, causes a deflection identified by an amount a1 with respect to the holding means 7 of the lamella.

Figure 2:
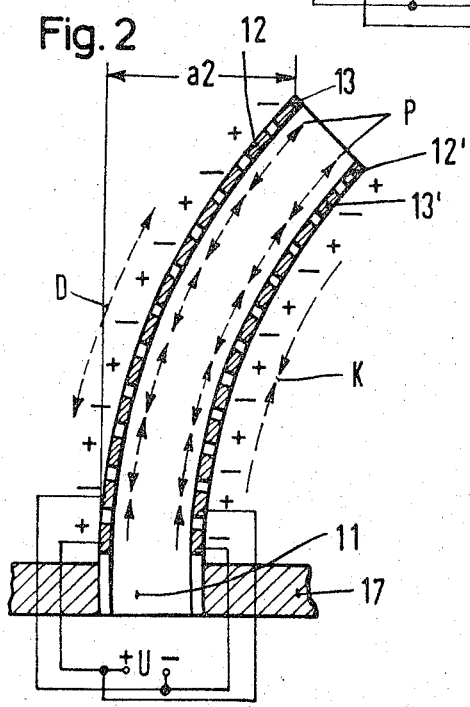
FIGS. 2 and 3 show diagrammatically an electrostrictive bar longitudinally polarized with electrically conductive coatings applied according to the invention.

While this arrangement according to the prior art is provided with lamellas having polarization extending transversely to the longitudinal direction of the bar, the embodiments according to the invention are provided with bars having polarization extending in a longitudinal direction. FIG. 2 shows a bar 11, which, as shown by the arrows, operates with a polarization P operative in the longitudinal direction, said polarization being operative on both sides of the one-piece bar 11. For that purpose the bar is provided with comb-like coatings 12 and 13 and also 12′ and 13′, so that, contrary to the embodiment according to FIG. 1, when a voltage U is applied, a longitudinal piezoelectric effect is produced instead of a transverse one.

Figure 3:
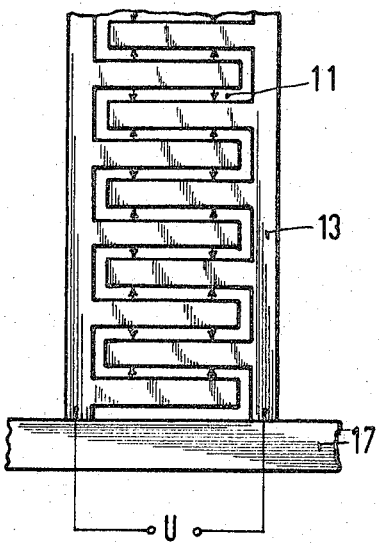

FIG. 3 shows how the coats 12 and 13 on the one side of bar 11 engage into each other in a comb-like manner, maintaining a distance apart from each other. If the source of operating voltage U is applied so that it operates on one side of the bar in the direction of polarization, and on the other side in opposition to the prevailing direction of polarization P, the bar is deflected by the value a2, with respect to the clamping location 17. Due to the fact that conductive coats are present on both sides of bar 11, a correspondingly large deflection results in connection with the direction of polarization P. Likewise, the expansion identified by reference character D is indicated by a double arrow of broken lines extending in the longitudinal direction of the bar, just as has been done for the compression identified with K.

FIGS. 4 and 5 show an embodiment according to the invention where the electrically conductive coats 12 and 13 are placed on bar 11 which is H-shaped in the plane of its maximum surface extension, and where the two shanks 11a and 11b resulting from this form are of opposite polarization. With all other conditions being equal, this arrangement results in a doubling of the deflection in comparison with a simple bar. The shanks 11a and 11b of bar 11 have points of separation at points T to provide an opposite polarization here, which points are electrically and conductively bridged only after the polarization of bar 11 is accomplished. When the operating voltage U is applied, the bar 11 is deflected by the value a3, as shown in FIG. 5. Here again the areas of compression are identified with K and those of expansion with D. If the applied operating voltage is reversed on polarity, the deflection of bar 11 accordingly takes place in the opposite direction.

An embodiment of a U-shaped electrostrictive bar with conductive coatings which is expedient for practical operation is shown in FIG. 6. Both shanks of bar 11 again are identified with reference character 11, while the electrically conductive coatings are numbered 12 and 13. As shown by the broken lines, these coatings are conductively connected, for example by soldering, at the previously noted points of interruption T, which are required for the polarization of the bar 11. In addition to the conductive coatings 12 and 13 used for the connection of the source of operating potential, another coating in the form of a contact path 14 is provided which leads to the contact element 15 located on the bar lamella.

In order to be able to create separate control voltage circuits for special switching purposes, it is possible to separate the comb-like coatings, as shown in FIGS. 7 and 8. By using separate control voltages, not only different deflections can be accomplished, but also an operational equalization of the deflection torques occurs in case of control voltages operative in opposite directions.

In FIG. 7 the deflection is positive in the polarity indicated with reference character I of the voltage sources U1 and U2, while the polarity indicated with reference character II of the connected voltage sources, provides a negative deflection. In the embodiment according to FIG. 8, a polarization of the voltage source in accordance with I and IV produces no deflection, while the polarization in accordance with II produces a negative deflection, and polarization in accordance with III causes a positive deflection of bar 11. The polarization of bar 11 is shown by arrows corresponding to the presentation in FIG. 3. The above-mentioned comments also apply to these separation points T of the conductive coatings 12 and 13.

Naturally, the particular solution according to the invention is not restricted to these embodiments. This applies in particular to the increased deflection obtainable by the U-shaped design of the electrostrictive bar. An arrangement of this kind may be used, for example, to carry a mirror of a light indication galvanometer, whereby a relatively large deflection is caused for the mirror used as reflector. The size of the movement of the mirror thereby is proportional to the voltage applied to the coatings.

Changes may be made within the scope and spirit of the appended claims which define what is believe to be new and desired to have protected by Letters Patent.

We claim:

1. A piezoelectric relay connected to a source of control voltage having a switching contact comprising a polarized bar composed of electrostrictive material having its polarization in layers in the longitudinal direction, and a plurality of electrically-conductive coatings vaporized-on said bar, each of said coatings having a comb-like shape for cooperating with a corresponding conductor in an interleaved spaced-apart relationship, said bar having a U-shaped configuration in the plane of its maximum surface extension, each of the two shanks resulting therefrom having opposite polarization.

2. A piezoelectric relay according to claim 1, wherein one of said shanks, preferably an extended shank of the U-shaped bar, is fastened in a stationary position, and the other shank is uninhibited for carrying the switching contact.

3. A piezoelectric relay according to claim 2, wherein each of said shanks is separated to provide each shank with an opposite polarization, the point of separation of the coatings between said shanks being conductively bridged after the polarization process.

4. A piezoelectric relay according to claim 2, wherein the electrostrictive bar has the shape of several continuous U-shaped strips.

5. A piezoelectric relay according to claim 1 wherein each of said coatings is divided into a plurality of separate coatings to control the separate coatings with a plurality of voltage circuits.

6. A piezoelectric relay according to claim 1 wherein the one-piece bar is made of ceramic material, such as barium titanate.

7. A piezoelectric relay according to claim 1 wherein the electrically conductive coatings are vaporized-on the bar operative as a base.

8. A piezoelectric relay according to claim 7, wherein the electrically conductive coatings of the layer-like bar are made of silver.

References Cited

UNITED STATES PATENTS 2,836,737   5/1958   Crownover.
3,155,791   11/1964   Crownover.
3,325,780   6/1967   Horan.

MILTON O. HIRSHFIELD, *Primary Examiner.*

J. D. MILLER, *Assistant Examiner.*